US006911135B1

(12) United States Patent
Thied et al.

(10) Patent No.: US 6,911,135 B1
(45) Date of Patent: Jun. 28, 2005

(54) PROCESS FOR SEPARATING METALS

(75) Inventors: Robert Charles Thied, Seascale (GB); Justine Elizabeth Hatter, Cheshire (GB); Kenneth Richard Seddon, Belfast (GB); William Robert Pitner, Belfast (GB); David William Rooney, Belfast (GB); David Hebditch, Wotton-Under-Edge (GB)

(73) Assignee: British Nuclear Fuels PLC (GB)

( * ) Notice: Subject to any disclaimer, the term of this patent is extended or adjusted under 35 U.S.C. 154(b) by 240 days.

(21) Appl. No.: 10/049,779

(22) PCT Filed: Aug. 18, 2000

(86) PCT No.: PCT/GB00/03194

§ 371 (c)(1),
(2), (4) Date: Jun. 26, 2002

(87) PCT Pub. No.: WO01/13379

PCT Pub. Date: Feb. 22, 2001

(30) Foreign Application Priority Data

Aug. 18, 1999 (GB) .............................................. 9919496

(51) Int. Cl.[7] .............................. C25C 1/32; C25C 3/34
(52) U.S. Cl. ............................ 205/44; 205/46; 205/560
(58) Field of Search ............................. 205/44, 46, 560

(56) References Cited

U.S. PATENT DOCUMENTS

| 3,972,787 A | 8/1976 | Nobel et al. |
| 4,624,753 A | 11/1986 | McManis, III et al. |
| 4,880,506 A | 11/1989 | Ackerman et al. |
| 5,009,752 A | 4/1991 | Tomczuk et al. |
| 5,378,381 A | 1/1995 | Takahashi et al. |
| 5,650,053 A | 7/1997 | Gay et al. |
| 5,827,602 A | 10/1998 | Koch et al. |

FOREIGN PATENT DOCUMENTS

| GB | 2150740 A | 7/1985 |
| WO | 98/06106 | 2/1998 |
| WO | 99/14160 | 3/1999 |
| WO | 99/41752 | 8/1999 |
| WO | 01/13379 | 2/2001 |

OTHER PUBLICATIONS

Wiberg: "Holleman–Wiberg, Lehrbuch der anorganischen Chemie, 71.–80. Auflage" 1971, Walter De Gruyter & Co., Berlin XP002151488. English version: Wiberg, *Inorganic Chemistry*, 1995, Walter De Gruyeter & Co., Berlin, pp. 1249–1253. no month.
International Preliminary Examination Report for corresponding application No. PCT/GB00/03194. Dec. 7, 2001.
Great Britain Search Report for *corresponding British* Application No. GB 9919496.1. Nov. 16, 1999.

*Primary Examiner*—Wesley A. Nicolas
(74) *Attorney, Agent, or Firm*—Myers Bigel Sibley & Sajovec

(57) ABSTRACT

A method for separating a metal from a composition including the metal involves forming an electrolytic cell in which the anode comprises a composition including the metal. The electrolyte is an ionic liquid. A sufficient potential difference is applied between the anode and the cathode to cause the metal to transfer from the anode to the cathode deposited thereon.

16 Claims, 3 Drawing Sheets

PROCESS FOR SEPARATING METALS

CROSS-REFERENCE TO RELATED APPLICATIONS

Figure 1:
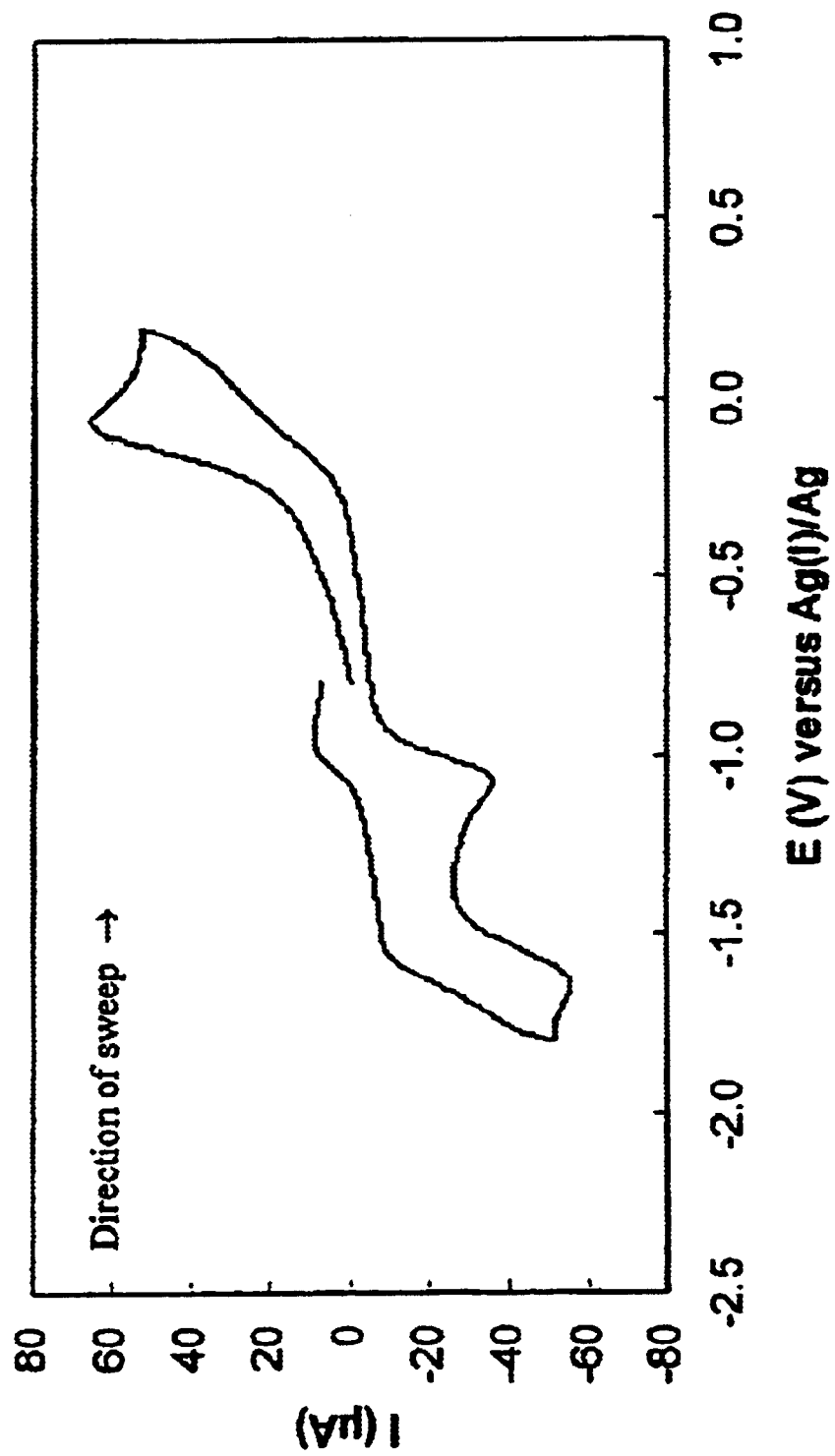

The present application claims priority under 35 U.S.C. § 371 from PCT Application No. PCT/GB00/03194 (published under PCT Article 21(2) in English), filed on Aug. 18, 2000 which claims the benefit of Great Britain Application Serial No. 9919496.1, filed on Aug. 18, 1999, the disclosures of which are incorporated by reference herein in their entire.

FIELD OF THE INVENTION

This invention relates to processes for the separation of metals from compositions containing metals. The invention includes processes for the treatment of spent nuclear fuel forming part of a process for reprocessing, conditioning and/or partitioning nuclear fuels. Reference will be made hereinafter mainly to nuclear fuels but it should be understood that the invention is not restricted to any particular type of material and has application outside the nuclear industry.

BACKGROUND OF THE INVENTION

In the metals recovery and refining industry generally, the type of metal recoverable from a solvent is dependent upon the size of the electrochemical window of the solvent in which the metal is dissolved, and from which purification and recovery is taking place. In aqueous solutions, this is governed by the electrochemical window of water or supporting electrolyte. This limits the recovery, purification and electroplating of metals on to surfaces from aqueous solution to those metals whose electrode reduction potentials are more positive than the cathodic limit of the aqueous solution. In acidic aqueous solution, metal ions would not be recoverable where their electrode reduction potentials are more negative than that of the $H_3O^+$ ION. Recovery of metals with electrode reduction potentials more negative than $H_3O^+$, means that non-aqueous (aprotic) solvents are required. There are a number of aprotic solvents which are used. There are a number of non-protic solvents which are used, These are often molten salts and, for instance, aluminium is industrially purified electrochemically by electrolysis of $Al_2O_3$ dissolved in molten cryolite $Na_3AlF_6$. Other aprotic media include the organic solvents, such as acetonitrile, benzene and toluene.

There exists two well developed processes which use molten salts for the reprocessing of irradiated nuclear fuel. The Argonne National Laboratory electrometallurgical treatment (ANL—EMT) process and the Dimitrovgrad State Scientific Centre, Research Institute of Atomic Reactors (SSC—RIAR) process both use molten salts at high temperatures (773 and 1000K respectively). The ANL process treats the spent nuclear fuel by a process called electrorefining in which current flow is used to oxidise a uranium anode to form uranium ions in the molten salt electrolyte. At the cathode the uranium is reduced and electrodeposited as uranium metal. The SSC—RLAR process uses chemical oxidants (chlorine and oxygen gases) to react with powdered $UO_2$ fuel to form higher oxidation state compounds such as $UO_2Cl_2$ which are soluble in the molten salt. At the cathode the uranium compounds are reduced to $UO_2$, which forms a dendritic deposit.

The disadvantage of these processes is that these molten salts are typically mixtures of salts which are liquid only at high temperatures and this causes inherent disadvantages in a reprocessing plant, in particular, as a result of the challenges posed in the engineering of the process and the materials of construction.

Ionic liquids free of molecular solvents were first disclosed by Hurley and Wier in a series of U.S. Pat. Nos. 2,446,331, 2,446,339, 2,446,350. In general terms an ionic liquid is a salt, a mixture of salts, or a mixture of components which produce a salt or a mixture of salts, which melts below or just above room temperature. (As used herein, the term "salt" means an entity comprising entirely of cationic and anionic species). Such liquids are known as "ionic liquids" although this term is sometimes used for salts which melt at relatively high temperatures. In this specification, the term "ionic liquid" refers to a salt which melts at a temperature of up to 100° C.

Co-pending patent application PCT/GB99/00246 discloses a method for reprocessing spent nuclear fuel which comprises dissolving the spent fuel or constituent parts of the spent fuel in an ionic liquid to substantially separate fissile material from other components of irradiated fuel. Also disclosed is the subsequent treatment of the resulting ionic liquor, either by solvent extraction or electrochemical treatment to recover the dissolved uranium and plutonium.

Whilst the methods described in PCT/GB99/00246 are suitable for general use and, in particular, for use in nuclear fuel reprocessing, it has previously been thought that an electrorefining process, which avoids the need for an initial chemical dissolution step, requires the use of a high temperature molten salt electrolyte. If fuel is chemically oxidatively dissolved, there is less control over the species which are dissolved during this step. All those species which will be oxidised by the oxidising agent added will enter into the solution. Because the oxidising agents and conditions are aggressive, most species will dissolve except for species such as the noble metals.

SUMMARY OF INVENTION

According to the present invention there is provided a method for separating a metal from a composition including said metal, the method comprising forming an electrolytic cell having an anode, a cathode and an electrolyte, the anode comprising a composition including said metal and the electrolyte comprising an ionic liquid, applying a sufficient potential difference between the anode and the cathode to cause the metal to transfer from the anode to the cathode and be deposited thereon.

Ionic liquids offer the ability to broaden the electrochemical window of the solvent in which the metal is dissolved, and from which purification or recovery is taking place. Ionic liquids have advantages over molten salts. As they operate at closer to ambient temperatures, they are probably less aggressive towards construction components, and engineering and process costs are likely to be less. They also have advantages over organic solvents such as acetonitrile, in being non-volatile, with consequent environmental benefits. Furthermore, metal species are usually more soluble in ionic liquids than in organic solvents.

Ionic liquids can be used to electrodeposit metals which are generally considered to be electropositive, for example, metals whose electrode reduction potentials are more positive than the $H_3O^+$ ion. An ionic liquid can be used for this task if there are benefits of using ionic liquids over aqueous based solutions. An example is the electroplating industry (for instance silver) where there are safety and environmental benefits of using ionic liquids rather than cyanide ion solutions.

Using an electrolytic cell in which the electrolyte is an ionic liquid and the anode is the metal composition to be separated, application of a suitable potential difference results in electrochemical oxidation of the metal at the anode, causing it to enter into the ionic liquid electrolyte medium. The soluble metal species is then electro-transported to the cathode where a reduction process occurs. These results are surprising because, previously, molten salts were the only materials with a sufficiently large electrochemical window for an electrochemical process requiring large potential differences, and the temperature at which the process was performed was dictated by the melting temperature of the salt. Ionic liquids provide large electrochemical windows at ambient temperatures.

Preferably the cation component of the ionic liquid is an organic cation, for instance, a nitrogen heterocycle such as N-substituted pyridinium (preferably alkylpyridinium, for instance, N-butylpyridinium), N,N'-disubstituted imidazolium (preferably N,N'-dialkylimidazolium, for instance, 1-ethyl-3-methylimidazolium), and substituted ammonium and phosphoniurn, for instance, tetraalkylanunonium (for instance, tetraoctylarnmonium) or tetraalkylphosphonium (for instance, tributyltetradecylphosphonium).

The substitutes are preferably hydrocarbyl and more preferably alkyl, which may be branched. The hydrocarbyl (e.g. alkyl) groups usually contain from 1 to 18 carbon atoms and some usually from 1 to 8 carbon atoms.

The cation may therefore preferably be a disubstituted imidazolium ion where the substitute groups take the form $C_nH_{2n+1}$ for $1 \leq n \leq 8$, and the substitute groups are linear or branched groups. In preferred disubstituted imidazolium ions one substitute has n=1, 2, 3 or 4 (of which methyl is particularly preferred) and the other has n=2, 3, 4, 5, 6, 7 or 8 (of which octyl, hexyl, and more particularly butyl are preferred, linear groups being preferred). Alternatively, the cation might be a substituted tetraalkylammonium or tetraalkylphosphonium ion, where the alkyl groups take the form of $C_nH_{2n+1}$ for $1 \leq n \leq 6$, and are linear or branched groups. Preferred examples include tetrabutylamnmonium and tetrabutylphosphoniumn. However, the alkyl groups are preferably of different lengths resulting in asymmetrical substitution. Alternatively, the cation might be a substituted pyridinium ion, where the substitute group also takes the form $C_nH_{2n+1}$ for $1 \leq n \leq 8$, and the substitute groups are linear or branched groups; suitable substitutes include butyl, 2-(2-methyl)propyl, 2-butyl and octyl but straight chain alkyl, especially butyl, is preferred.

The ionic liquid may be a mixture of two or more ionic liquids, which together provide the desired properties such as, for instance, a lower viscosity. An example is a mixture of disubstituted imidazolium in which the components of the mixture have alkyl groups of different lengths, e.g. a mix of 1-octyl-3-methylimidazolium chloride ([emim]Cl) and 1-ethyl-3-methylimidazoliun chloride ([omim]Cl).

The anion component is likely to be an inorganic species such as halide (for instance, chloride), nitrate, sulphate, tetrafluoroborate, hexafluorophosphate or tetrachloroaluminate, triflate which is trifluoromethane-sulfonate ($CF_3SO_3$), and bistrifylimide which is bis (trifluoromethanesulfonyl)imide ($[CF_3SO_2]_2N]$).

Preferably the ionic liquid will be pre-loaded with metal ions, in order that the electrorefining process can be initiated. Such pre-loading may be achieved by, for example, the addition to the ionic liquid of a soluble uranium salt or a salt such as cadmium chloride. Addition of a metal salt, such as cadmium chloride, results in the reaction of this metal salt with uranium metal, creating metal ions in the solution.

Pre-loading with uranium ions may also be achieved by displacement of a metal chloride, such as AgCl or $Cd\,Cl_2$. Alternatively, pre-loading with uranium ions may be achieved by destructive reduction of the electrolyte. At the anode uranium is oxidised to a soluble uranium species and, within a cathode compartment separated from the bulk of the solution, the organic cation of the ionic liquid or sacrificial organic reagent added to it, is destroyed.

The process can be applied to a variety of metal fuel feeds. Preferably the metal composition to be treated is irradiated nuclear fuel and the metal to be separated is uranium. Uranium or a uranium compound will be deposited at the cathode in a purified form. By changing the potential at the cathode, or by adding a second cathode to the system, it is possible to achieve separation and deposition of partly purified plutonium.

By contrast with a process involving chemical dissolution, in an electrochemical process there can be much greater selectivity of the species to be dissolved. The potential at the anode can be controlled, such that metals which are more electropositive than uranium, and with larger negative Gibbs free energies associated with the species formed in solution, are the only metals which dissolve at the anode. This is the first separation step, as many of the more noble metals will remain behind in an anodic sludge. The ionic liquid now contains a solution of metal ions including uranium and those of more electropositive species. A suitable potential is applied at the cathode, whereby uranium and metals less electropositive than uranium are electrode-posited This should only include uranium, as those less electropositive metals have not been anodically dissolved.

DETAILED DESCRIPTION OF THE INVENTION

If oxide fuels are to be treated there will probably be a need for a pre-treatment step, such as that performed in the ANL Lithium reduction process, to reduce the oxide fuel and form a metal feed. The metal fuel may also undergo a decladding process. This could take a number of forms such as mechanical removal or chemical dissolution of the cladding.

In a preferred embodiment of the invention irradiated nuclear fuel feed in the form of metal is placed within an anode basket. The anode basket is then immersed within an ionic liquid, together with a suitable cathode, such as a stainless steel mandrel. Through the application of a suitable potential difference between the anode and cathode, uranium metal will be electrochemically oxidised at the anode, and enter into the ionic liquid electrolyte medium. The soluble uranium species will then be electro-transported to the cathode, where a reduction process occurs. Contaminants with more positive reduction potentials than uranium will remain unoxidised in the anode basket. Similarly, contaminants with more negative reduction potentials than uranium will remain unreduced in solution.

Electro-reduction of the soluble uranium species should result in the deposition of uranium metal (or a uranium compound) at the cathode. Provided that a suitable oxidising potential is applied at the anode and a suitable reduction potential is applied at the cathode, uranium or a uranium compound will be deposited at the cathode in a purified form.

The ionic liquid contains fission product compounds and compounds of the actinide elements which are oxidised from the cathode with the uranium and must be stripped of these contaminants before its subsequent re-use. This may be achieved by any one or a combination of a number of different routes. Selected fission products and actinides such as plutonium can be electrochemically extracted through the application of a suitable potential using a liquid metal cathode such as a mercury electrode. Alternatively, dissolved plutonium may be co-deposited on the cathode with the uranium, irrespective of whether the metals are deposited in the metallic state (in the (0) oxidation state), as complexes or as oxides. Such co-deposition is useful in the manufacture of mixed oxide fuels.

Selective deposition of a metal from a solution containing its ions is well known in the art and does not require detailed explanation here. However all metal ions in a solution will have different electrode reduction potentials to reduce the ions to a lower positive valency, or to reduce them to zero valency. Electrode reduction potentials are dependent upon the element, the oxidation state of the ion in the solvent and to the presence of other ions or molecules. If a potential is applied across a solution then all metal ions with a more positive potential will be deposited on the cathode. Metal ions with a more negative potential will remain in solution. Once a particular ion has been removed from the solution, the electrode can be removed and replaced with a new one, biased at a slightly more negative potential, for the deposition of the next metal with a more negative reduction potential. If it is desired to deposit two metals together, then a potential more negative than the reduction potential for both ions is applied, Certain organic cations are selected for the ionic liquid, to give extremely low reduction potentials. The lower the "cathodic window" of the solvent, the greater the range of species which can be removed from solution by electroreduction. For example, imidazoliumn cations give at least a 1 volt advantage over aqueous solutions.

Fission products may alternatively or additionally be removed from the ionic liquid by the addition of an organic solvent. Addition of an organic species results in the precipitation of fission product compounds. The precipitate can be filtered from the ionic liquid and calcined to convert to oxide prior to a vitrification step. Cleaned ionic liquid can then be recycled to the electrorefiner.

In order to maximise process rate the electro-refining equipment is engineered to minimise anode to cathode distance and the cathode deposit is removed and collected. The latter step also prevents electrical shorting between the anode and cathode due to the growth of metallic dendrites.

The invention will now be further described with reference to the following examples. In each case the reference electrode was immersed in a 0.1 Molar solution of silver nitrate in [bmim] $NO_3$, separated from the bulk solution in a glass tube with a porous Vycor tip.

Example 1

Anodisation of a Uranium Electrode in [bmim]$NO_3$ at Room Temperature

An electrochemical cell was set up with a separated platinum coil counter electrode, a Ag reference electrode, a uranium metal plate working electrode and [bmim]$NO_3$ (1-butyl-3-methylirmidazolium nitrate) as electrolyte. Electrolysis was carried out by applying a potential of +0.6V to the uranium electrode. After the passage of 1000 Coulombs, the uranium electrode was removed and weighed. The weight loss of the uranium (0.78 g) indicated that the uranium species required 3.2 equivalents per mole, indicating the production of a U(III) species.

Example 2

Electrorefining Uranium in [heim]Cl at 70° C.

Due to the viscosity of [heim]Cl 1-hexyl-3-ethylimidazohium nitrate chloride, this work was carried out at 70° C. A solution of U(III) was produced in [heim]Cl as by electrolysis of a uranium electrode at +0.3 V. This is anodic dissolution of the uranium metal, as in Example 1. Comparison of the charge passed (1235 Coulombs) with the weight loss of the uranium electrode (1.012 g) gives a charge to mass balance of 3.0 eqv/mol, indicating the production of a U(III) species. The platinum counter electrode used in the preparation of this solution was then replaced with a copper wire immersed in the U(III) solution. Electrolysis was carried out at an applied potential of −1.6 V to the copper cathode; the uranium metal electrode served as the anode. A total of 236 Coulombs was passed during the electrolysis. The weight gain of the cathode electrode was only 18.7 mg compared to the 193 mg weight loss of the uranium anode. This clearly shows that uranium has been electrotransported from the anode to the cathode, the current efficiency being only about 10%. Material which settled on the bottom of the cell indicated that deposited uranium does not adhere well to copper. The charge to mass loss of the uranium electrode (236 C/193 mg=3.0 eqv/mol) indicated that even while acting as a counter electrode, the species produced through anodisation is still U(III).

Example 3

Voltammetry of U(III) in [emim]Cl at 80° C.

7.99 g [emim] Cl was melted at 80° C. A solution containing 0.03 mol $L^{-1}$ (U(III)) was produced by the anodiation of a uranium rod ($Q^{TM}$ 111C) as in Example 1. Cyclic voltammograms were recorded in the resulting solution at a glassy carbon electrode. A typical voltammogram is shown in FIG. 1. The oxidation of U(III) to U(IV) occurs at potentials greater than ca. −0.2V versus Ag(I)/Ag. This process is irreversible, as demonstrated by the large difference in the anodic and cathodic potentials (−0.06 and −1.07 V, respectively). The reduction of U(III) to U metal occurs at potentials less than ca. −1.5V.

This example thus shows the potential at which uranium (III) is reduced to metal, and shows that uranium can be purified from other metals, such as plutonium, by an electrochemical means.

Example 4

Anodation of Pu(III) in [emim]Cl at 90° C.

An electrochemical cell was set up with a separated platinum coil counterelectrode, a Ag reference electrode, and a plutonium metal rod working electrode. Electrolysis was carried out by applying a potential of −1.5V to the plutonium electrode. After the passage of 27.5C. the plutonium electrode was removed and weighed. A direct comparison of the weight loss of the plutonium (80 mg) with the charge passed would erroneously indicate that the plutonium species generated was Pu(II). However, it was noted that plutonium metal in contact with the ionic liquid reacts spontaneously; the bright metal quickly forms a dark layer of corrosion products as the metal undergoes oxidation and the ionic liquid cation undergoes reduction. This is most likely because the reduction potential of Pu(III) is more negative than that of the 1-ethyl-3-methylimidazolium cation (ca. −2.2V). Therefore, given the known chemistry of plutonium in chloride media, it is most likely that the species generated during electrolysis is Pu(III); the excess weight loss is due to spontaneous corrosion.

This example shows evidence that plutonium can anodically dissolve into an ionic liquid, and that the oxidation state is probably Pu(III).

The spontaneous corrosion of the plutonium is not necessarily a process issue, as when the basket contents are under electrotransport conditions, electrons are passed round the circuit to the cathode, rather than passing to the cations of the ionic liquid.

Example 5

Voltammetry of Pu(III) in [emim]Cl at 90° C.

Figure 2:
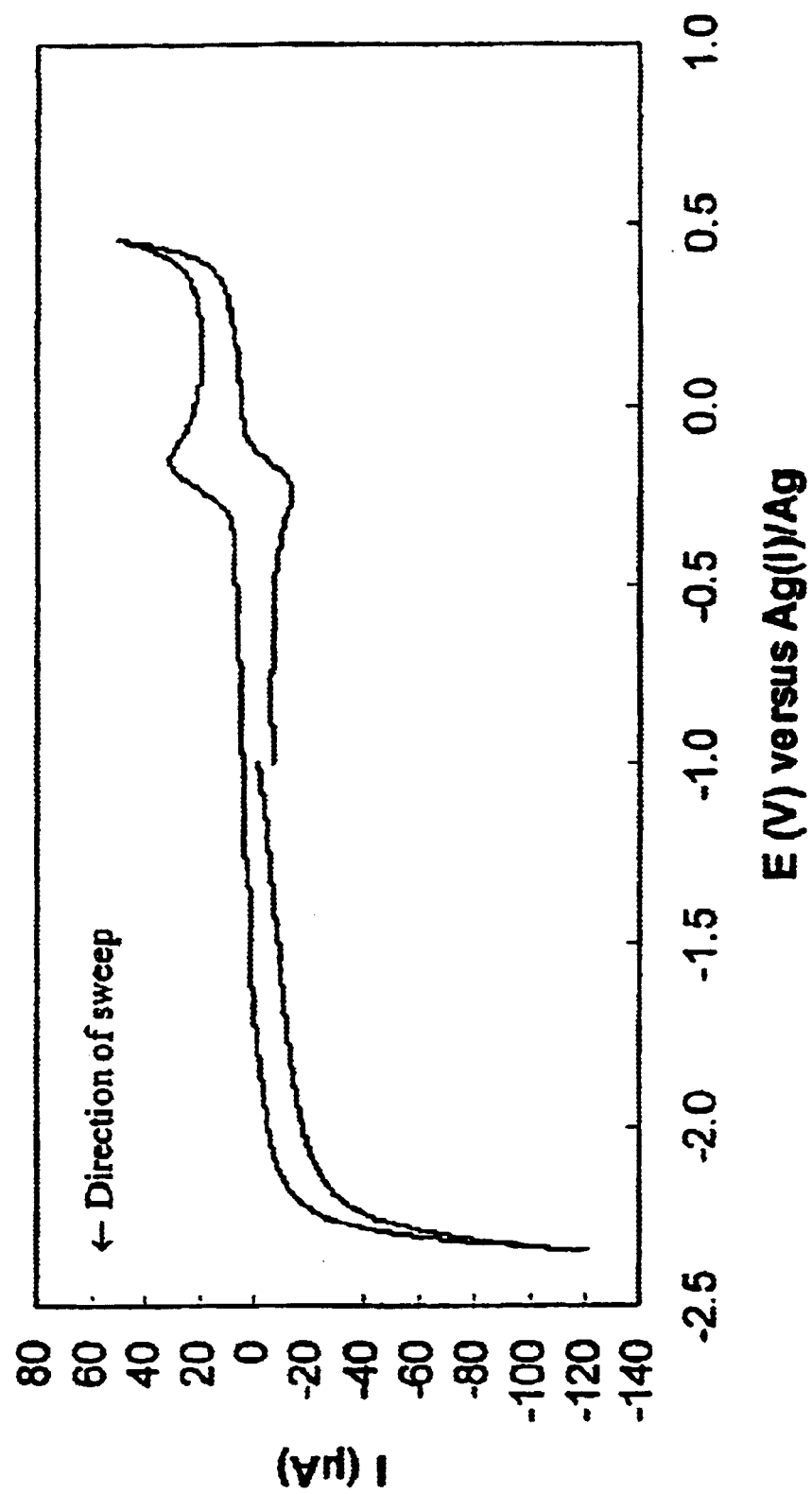
Figure 3:
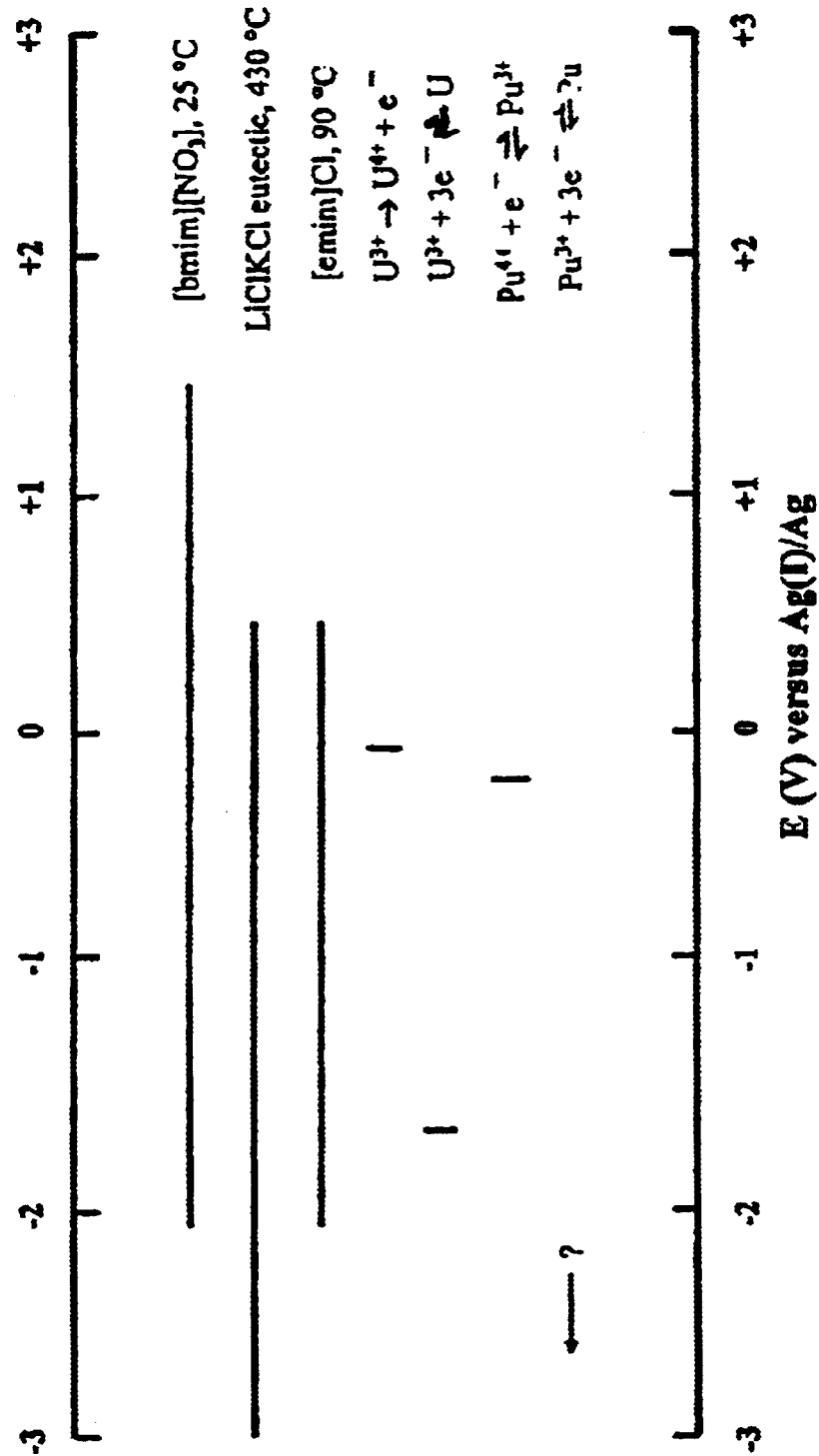

Cyclic voltammograms were recorded at a glassy carbon electrode in the Pu(III) solution produced by anodisation of Pu(III) in [emim]Cl described in Example 4. A typical voltarnmogram is shown in FIG. 2. The oxidation of Pu(III) to Pu(IV) occurs at potentials greater than ca. −0.2V. The Pu(IV)/Pu(III) redox couple is quasi-reversible with $\Delta E_p \approx 90$ mV ($E_p{}^a$=−0.15V, $E_p{}^c$=−0.24V). From the voltammogram, it is clear that reduction of Pu(III) to generate the metal does not occur at potentials greater than −2.2V, the cathodic limit of the ionic liquid below which potential the cation is reduced. A comparison of the potential windows of [bmim][NO$_3$], [emim]Cl and LiCl—KCl eutectic is shown in FIG. 3, which also graphically displays the potentials of various redox couples of plutonium and uranium in [emim]Cl at 90° C. from Example 3 and Example 5. It should be clear from this graphic that the electrodeposition of uranium without the simultaneous deposition of plutonium is possible in the [emim]Cl ionic liquid at 90° C., allowing separation of uranium from plutonium.

This graphic shows that the electrochemical window of [emim]Cl at 90° C. is sufficiently wide that the reduction of U(III) to uranium metal can be performed within the ionic liquid, but is insufficiently wide for this to be the case with plutonium. Hence purification of uranium from plutonium is possible.

Use of a liquid metal electrode, such as mercury, may shift the electrode reduction potential of plutonium, so that it can too be electrodeposited at the liquid cathode. As an alternative, a different ionic liquid may be used, specifically one which has a wider electrochemical window, for instance, a tetraalkylammoniurn ionic liquid.

Example 6

Precipitation of Fission Products from [hmim]Cl Using an Organic Solvent

Europium(III) chloride (EuCl$_3$) was used to simulate fission products dissolved in an ionic liquid. 4.66 g [hmim]Cl and 1.05 g EuCl$_3$ were dissolved in 20 cm$^{-3}$ dry acetonitrile. This solution was heated to 70° C. under reflux in a dry dinitrogen atmosphere for 3 hours and allowed to cool. After approximately 30 minutes in a refrigerator, fine white crystals had precipitates 1.81 g of precipitate were collected. The results of elemental analysis of the crystals were 41.04% carbon, 6.86% hydrogen, and 9.22% nitrogen. The theoretical composition of the complex [hmim]$_3$[EuCl$_6$] (C$_{30}$Cl$_6$EuH$_{57}$N$_6$, RAM=866.50 g mol$^{-1}$) is 41.58% carbon, 6.63% hydrogen and 9.70% nitrogen which suggests that this is the identity of the precipitate.

This Example shows that fission products dissolved within an ionic liquid can be recovered by the addition of an organic solvent.

What is claimed is:

1. A method for separating a metal from a composition including said metal, the method comprising forming an electrolytic cell having an anode, a cathode and an electrolyte, the anode comprising a composition including said metal and the electrolyte comprising an ionic liquid comprising an organic cation component, applying a sufficient potential difference between the anode and the cathode to cause the metal to transfer from the anode to the cathode and be deposited thereon.

2. A method according to claim 1 wherein the organic cation includes alkyl groups which arc linear or branched and not all of the same chain length.

3. A method according to claim 1 wherein the electrolytic cell comprises an anion selected from a group consisting of halide, nitrate, sulphate, tetrafluoroborate, hexafluorophosphate and tetrachloroaluminate.

4. A method for separating a metal from a composition including said metal, the method comprising forming an electrolytic cell having an anode, a cathode and an electrolyte, the anode comprising a composition including said metal and the electrolyte comprising an ionic liquid, applying a sufficient potential difference between the anode and the cathode to cause the metal to transfer from the anode to the cathode and be deposited thereon, wherein the electrolytic cell comprises an trifluoromethanesulfonate bis (trifluoromethanesulfonyl)imide anion component.

5. A method according to claim 1 wherein the ionic liquid is pre-load with metal ions.

6. A method according to claim 5 wherein the ionic liquid is pre-loaded with metal ions by the addition of a soluble uranium salt.

7. A method according to claim 5 wherein the ionic liquid is pre-loaded with uranium ions by displacement of a metal chloride.

8. A method according to claim 7 wherein the metal chloride comprises AgCl or CdCl$_2$.

9. A method according to claim 5 wherein the ionic liquid is pre-loaded with uranium ions by destructive reduction of the electrolyte.

10. A method according to claim 1 further comprising depositing purified metal at the cathode.

11. A method for separating a metal from a composition including said metal, the method comprising forming an electrolytic cell having an anode, a cathode and an electrolyte, the anode comprising a composition including said metal and the electrolyte comprising an ionic liquid, applying a sufficient potential difference between the anode and the cathode to cause the metal to transfer from the anode to the cathode and be deposited thereon as a compound.

12. A method according to claim 1, wherein the composition to be separated is irradiated nuclear fuel.

13. A method according to claim 1, wherein the metal to be separated comprises uranium.

14. A method according to claim 1 further comprising purifying the ionic liquid for further use.

15. A method according to claim 1 wherein the metal to be separated comprises plutonium.

16. A method according to claim 1 wherein the organic cation is selected from a group consisting of N-substituted pyridinium, N,N'-disubstituted imidazolium, tetraalkylammonium or tetraalkylphosphonium.

* * * * *

UNITED STATES PATENT AND TRADEMARK OFFICE
CERTIFICATE OF CORRECTION

PATENT NO. : 6,911,135 B1
DATED : June 28, 2005
INVENTOR(S) : Thied et al.

It is certified that error appears in the above-identified patent and that said Letters Patent is hereby corrected as shown below:

<u>Column 8,</u>
Line 31, should read -- is pre-loaded with metal ions. --.

Signed and Sealed this

Eighth Day of November, 2005

JON W. DUDAS
*Director of the United States Patent and Trademark Office*